(12) United States Patent
Indyk et al.

(10) Patent No.: US 11,999,104 B2
(45) Date of Patent: Jun. 4, 2024

(54) THREE-DIMENSIONAL PRINTING HEAD WITH ADJUSTABLE PRINTING ANGLE

(71) Applicant: Mighty Buildings, Inc., San Francisco, CA (US)

(72) Inventors: Denis Indyk, Tomsk (RU); Igor Bolgov, San Mateo, CA (US); Aleksei Dubov, San Mateo, CA (US)

(73) Assignee: Mighty Buildings, Inc., Oakland, CA (US)

( * ) Notice: Subject to any disclaimer, the term of this patent is extended or adjusted under 35 U.S.C. 154(b) by 34 days.

(21) Appl. No.: 17/219,866

(22) Filed: Mar. 31, 2021

(65) Prior Publication Data

US 2022/0314537 A1 Oct. 6, 2022

(51) Int. Cl.
*B29C 64/209* (2017.01)
*B29C 64/118* (2017.01)
*B29C 64/241* (2017.01)
*B29C 64/277* (2017.01)
*B29C 64/321* (2017.01)
(Continued)

(52) U.S. Cl.
CPC .......... *B29C 64/209* (2017.08); *B29C 64/118* (2017.08); *B29C 64/241* (2017.08); *B29C 64/277* (2017.08); *B29C 64/321* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/209; B29C 64/321; B29C 64/118; B29C 64/393; B29C 64/241; B29C 64/277; B33Y 10/00; B33Y 30/00; B33Y 50/02

USPC .......... 269/63, 64, 67, 74
See application file for complete search history.

(56) References Cited

U.S. PATENT DOCUMENTS 10,076,880 B2 * 9/2018 Page .............. B29C 64/10
10,571,642 B1 * 2/2020 Cohen ............ B29C 64/209
(Continued)

FOREIGN PATENT DOCUMENTS

CN 211467487 U 9/2020

OTHER PUBLICATIONS

International Search Report and Written Opinion in International Application No. PCT/US2022/017386 dated Jun. 28, 2022.

*Primary Examiner* — Philip C Tucker
*Assistant Examiner* — Andrew L Swanson
(74) *Attorney, Agent, or Firm* — Cognition IP, P.C.; Edward Steakley; Justin White

(57) ABSTRACT

A 3D printing system can include an extruding system, a curing system, a positioning system, and a feedback system. The extruding system can include a feed pipe coupled to a printing material source and a nozzle having a longitudinal axis along which printing material is extruded. The nozzle can extrude printing material at a printing angle between the longitudinal axis and the top surface of a layer of printing material being printed. The curing system can include light or other curing components configured to cure the printed material after extrusion. The positioning system can include a platform that supports the extruding system and a platform rotating subsystem that rotates the platform during the printing process to adjust the printing angle. The feedback system can include a processor and sensors to detect the location of the nozzle with respect to the 3D printed object or other objects in the printing area during the printing process.

23 Claims, 9 Drawing Sheets

(51) Int. Cl.
  *B29C 64/393*   (2017.01)
  *B33Y 10/00*   (2015.01)
  *B33Y 30/00*   (2015.01)
  *B33Y 50/02*   (2015.01)

(56) References Cited

U.S. PATENT DOCUMENTS

| | | | | |
|---|---|---|---|---|
| 2014/0044822 A1* | 2/2014 | Mulliken | ............... | B29C 64/00 |
| | | | | 425/113 |
| 2015/0028523 A1 | 1/2015 | Jaker et al. | | |
| 2015/0239178 A1* | 8/2015 | Armstrong | ............ | B33Y 40/00 |
| | | | | 700/98 |
| 2015/0367576 A1* | 12/2015 | Page | ............... | B29C 70/06 |
| | | | | 425/132 |
| 2016/0221265 A1 | 8/2016 | Snyder et al. | | |
| 2017/0028640 A1* | 2/2017 | Harrison | ............... | B29C 64/129 |
| 2017/0066193 A1* | 3/2017 | Kim | ............... | B29C 64/241 |
| 2017/0066194 A1* | 3/2017 | Bromer | ............... | B29C 64/386 |
| 2017/0190109 A1* | 7/2017 | Holland | ............... | B29C 64/118 |
| 2017/0217100 A1* | 8/2017 | Gardiner | ............... | B29C 64/209 |
| 2018/0253080 A1* | 9/2018 | Meess | ............... | B29C 64/393 |
| 2018/0311898 A1* | 11/2018 | Schwarzbaum | ...... | B29C 64/277 |
| 2018/0326660 A1* | 11/2018 | Gifford | ............... | B29C 64/209 |
| 2019/0047309 A1* | 2/2019 | Weiss | ............... | B05B 15/50 |
| 2019/0091929 A1* | 3/2019 | Harrison | ............... | B29C 48/303 |
| 2019/0291346 A1* | 9/2019 | Rudolph | ............... | B33Y 10/00 |
| 2019/0351615 A1* | 11/2019 | Baker | ............... | B29C 64/129 |
| 2020/0023575 A1* | 1/2020 | Maccagnan | ............ | B29C 64/209 |
| 2020/0030491 A1* | 1/2020 | Weisman | ............... | B33Y 40/00 |
| 2020/0230886 A1* | 7/2020 | Takano | ............... | B33Y 30/00 |
| 2020/0406554 A1* | 12/2020 | Belorustsev | .......... | B29C 64/277 |
| 2021/0001424 A1* | 1/2021 | Burla | ............... | B23K 26/048 |
| 2021/0060854 A1* | 3/2021 | Wynne | ............... | B33Y 50/02 |
| 2021/0107218 A1* | 4/2021 | Brahmstedt | ............ | B29C 64/25 |

* cited by examiner

THREE-DIMENSIONAL PRINTING HEAD WITH ADJUSTABLE PRINTING ANGLE

CROSS-REFERENCE TO RELATED APPLICATION

This application is related to U.S. patent application Ser. No. 17/219,863 filed on this same date of Mar. 31, 2021 and entitled "HIGH INTENSITY LIGHT CURING FOR THREE-DIMENSIONAL PRINTING," which application is hereby incorporated by reference in its entirety herein.

TECHNICAL FIELD

The present disclosure relates generally to three-dimensional ("3D") printing, and more particularly to 3D printing using a moving printing head.

BACKGROUND

Recent advancements in additive manufacturing based on layer-by-layer 3D printing have resulted in custom design diversification, efficient manufacturing without a complex supply chain, low waste, and high automation, among other advantages. One of many such advancements includes the use of a movable printing head within a 3D printing system, which can allow for automated 3D printing at relatively high speeds.

Unfortunately, traditional uses of a moving printing head are limited due to inflexible printing head movements and a fixed angle of the nozzle or other printing component within the printing head. For example, traditional moving printing heads utilize a fixed angle nozzle and are limited to movement within an XY plane, which results in 3D printed layers being deposited only along that XY plane. This then limits the ability to print objects with complex curvatures or geometries and can also limit the speed at which many complex objects are printed.

Although traditional ways of 3D printing with moving printing heads have worked well in the past, improvements are always helpful. In particular, what is desired are 3D printing systems that allow for more flexibility in the types of 3D objects having complex geometries that can be printed, as well as the speeds at which such 3D objects can be printed.

SUMMARY

It is an advantage of the present disclosure to provide 3D printing systems that allow for more flexibility in the types of 3D objects having complex geometries that can be printed, as well as the speeds at which such 3D objects can be printed. The disclosed features, apparatuses, systems, and methods provide improved 3D printing solutions that involve a 3D printing head with an adjustable printing angle. These advantages can be accomplished in multiple ways, such as by including a positioning system having a platform that supports an extrusion system including a nozzle, as well as a platform rotating subsystem and a feedback system that allows for automated movement and printing angle changes during the 3D printing process.

In various embodiments of the present disclosure, a 3D printing system can include an extruding system, a curing system, and a positioning system. The extruding system can include a feed pipe coupled to a printing material source and a nozzle coupled to the feed pipe, the nozzle having a longitudinal axis along which printing material is extruded during a printing process to form at least a portion of a 3D printed object. The nozzle can be configured to extrude printing material fed thereto by way of the feed pipe at a printing angle defined as the angle between the longitudinal axis and the top surface of a layer of printing material being printed. The curing system can include a plurality of curing components configured to cure the printed material after the printed material has been extruded from the nozzle. The positioning system can include a platform configured to support the extruding system and a platform rotating subsystem configured to rotate the platform during the printing process, wherein rotating the platform adjusts the printing angle.

In various detailed embodiments, the feed pipe can include a first segment coupled to the printing material source and a second segment removably coupled to the first segment and coupled to the nozzle. The second segment of the feed pipe can form a straight pipe segment, a telescopic elbowed pipe segment, or another type or shape of pipe segment. The extruding system can further include a protective skirt located proximate the nozzle, which protective skirt can be configured to shield printing material from the curing system as the printing material is extruded from the nozzle. The extruding system can also include a source coupler configured to removably couple the feed pipe to the printing material source, and/or a nozzle coupler, such as a loop connector, configured to provide a tight connection between the feed pipe and the nozzle. The plurality of curing components can include light emitting curing components and/or a light focusing subsystem. The positioning system can also include a first drive configured to rotate the platform during the printing process and a second drive configured to rotate the curing system during the printing process.

In further detailed embodiments, the 3D printing system can also include a feedback system including at least a processor and one or more sensors. The feedback system can be configured to detect the location of the nozzle with respect to the 3D printed object or other objects during the printing process. Sensors can include at least one printed material layer height measuring sensor configured to facilitate quality control regarding further printing process correction, at least one safety sensor configured to facilitate collision prevention between the 3D printing system and the 3D printed object or one or more other objects around the 3D printing system, at least one position identifying sensor configured to facilitate system calibration and position adjustment, and/or least one curing intensity sensor configured to facilitate curing quality control. The feedback system can further include one or more cameras configured to facilitate visual quality control. Such cameras can include a video camera configured to facilitate visual in-process quality monitoring and a thermal vision camera configured to facilitate visual in-process inspection of printed material curing and curing intensity adjustment.

In further embodiments of the present disclosure, various methods of 3D printing a 3D printed object are provided. Pertinent process steps can include supplying a printing material, extruding the printed material from a nozzle, moving the nozzle laterally during printing, curing the printing material, and rotating an orientation of the nozzle. The printing material can be supplied through a feed pipe to the nozzle, which can have an extrusion opening. The printed material can be extruded from the extrusion opening of the nozzle along a longitudinal axis of the nozzle at a printing angle, wherein the printing angle is the angle between the longitudinal axis and the top surface of a layer of printing material being printed. The printing material can be cured using a curing system after the printing material has been extruded from the nozzle to form a layer of printing material. Rotating the orientation of the nozzle can change the printing angle.

In various detailed embodiments, all of the foregoing process steps can be performed simultaneously. Additional process steps can include shielding the printing material at the extrusion opening from the curing system, rotating an orientation of the curing system while curing the printing material, adjusting an intensity of the curing system while curing the printing material, and/or receiving feedback from a location sensor that detects the location of the nozzle with respect to the 3D printed object. The rotating can be performed in response to the feedback.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, systems and methods for 3D printing at an adjustable printing angle for a printing head or other similar 3D printing component. These drawings in no way limit any changes in form and detail that may be made to the disclosure by one skilled in the art without departing from the spirit and scope of the disclosure.

DETAILED DESCRIPTION

Figure 1:
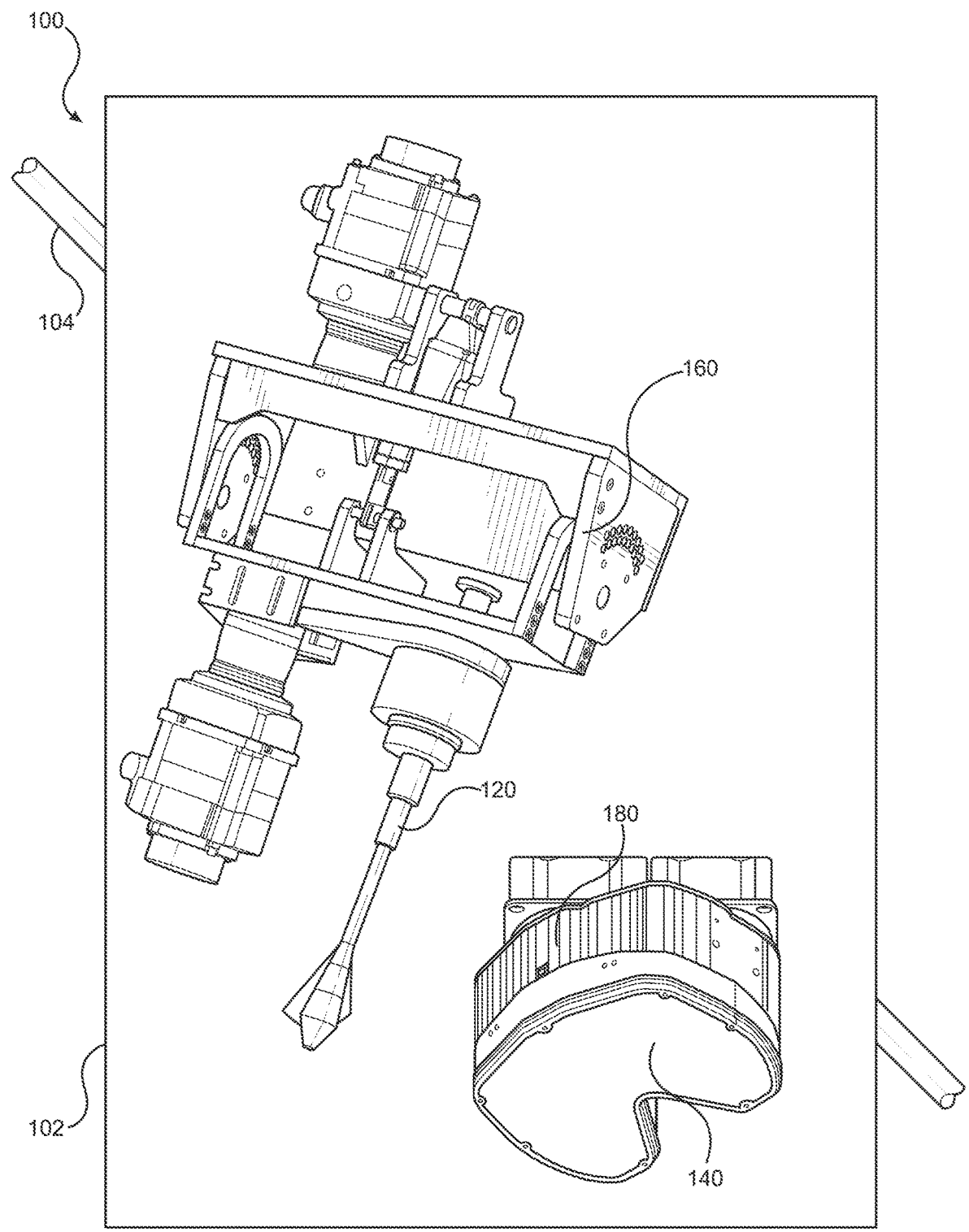
FIG. 1 illustrates in front perspective view an example 3D printing system according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for 3D printing at an adjustable printing angle for a printing head or other similar 3D printing component. The disclosed embodiments can include specialized 3D printing systems, as well as methods of using the specialized 3D printing systems. In particular, the disclosed embodiments can involve the use of a printing head or other similar printing component that can have its printing angle adjusted during a 3D printing process. Specifically, the printing head of a 3D printing system can have its printing angle adjusted during printing. The disclosed embodiments also include a curing system that can have its curing angle adjusted and its curing intensity adjusted during the 3D printing process.

In various embodiments, the disclosed 3D printing system can be utilized in the building industry for printing houses and various parts thereof, such as walls, wall panels, roofs, floors, and the like. A printing head of the 3D printing system can deposit printed layers within each of the XY, YZ, XZ planes and any combination thereof, as well as planes that are spherical and angular to these and other planes. The ability to change the inclination or printing angle of the printing head and nozzle during the 3D printing process makes it possible to print hinged structures, such as ceilings and floors, for example, to print layers onto any surfaces with or without obstacles, such as printing on a frame or printing around a beam, for example, and also to print objects with complex geometric shapes and configurations, such as hyperboloids.

The many advantages provided by the disclosed embodiments enable unique manufacturing methods of 3D printing to produce building structures from floors to ceilings, to print around structural frames of buildings, to print complex infill portions of building structures or building components, and to print lightweight and durable complex structures, such as hyperboloid structures. 3D printing at an adjusted angle also avoids or significantly reduces warpage in the printed materials and allows for more robust and stronger products in the case of curved or complex geometries. These and other advantages provide significant improvements over traditional 3D printing processes of buildings and the parts of thereof in terms of efficiency, labor cost reduction, high quality and preciseness in automation levels, and the variety of the designs may be printed utilizing the disclosed technologies.

Features of the disclosed embodiments include an extruding system, a curing system, a positioning system, and a feedback system, each of which has its own unique and advantageous components. The extruding system can include a portioned or sectioned feed pipe as well as a nozzle that extrudes printing material at a printing angle that can be adjusted during the printing process. The curing system can include curing components that can focus light or other curing media at an angle that can be adjusted in correlation with the printing angle of the nozzle. The positioning system can include a platform to which the extruding system is mounted as well as a platform rotating subsystem that can rotate the platform to adjust the printing angle of the extruding system as well as the curing angle of the curing system. The feedback system can include a processor, one or more sensors, and one or more cameras that can combine to detect the position of the various 3D printing system components and the curing levels of the curing system and are able to adjust the automated printing process accordingly.

Although various embodiments disclosed herein discuss 3D printing with respect to buildings and building components, it will be readily appreciated that the disclosed features, apparatuses, systems, and methods can similarly be used for any relevant type of 3D printing and any 3D printed object. For example, the disclosed system and methods can be used to 3D print models, figures, and other items that are not for use in building construction. Other applications, arrangements, and extrapolations beyond the illustrated embodiments are also contemplated.

Referring first to FIG. 1, an example 3D printing system is illustrated in front perspective view. 3D printing system 100 can include an extruding system 120, a curing system 140, a positioning system 160, and a feedback system 180. In some embodiments, each of these components can be included in a movable printing head 102 that can be coupled to a gantry system 104. The gantry system 104 can be constructed to allow the printing head 102 to be moved in a variety of directions during a 3D printing process, as will be readily appreciated by those of skill in the art. In various embodiments, some components of these systems may be located elsewhere from the movable printing head 102. For example, one or more processors of the feedback system 180 may be located outside the printing head 102.

Extruding system 120 can include various subsystems and components that provide a supply of printing material from a feeding hose to a nozzle where the material is then printed. Curing system 140 can be an optical curing system, for example, and can include various subsystems and components that provide curing of the printed material. In some embodiments, the printed material can be a light-activated material and the curing components can focus light at one or more wavelengths between 200 and 1000 nm on the light-activated material to solidify the printed material during 3D printing operations. The exact wavelength can depend on the exact printing polymer or other material used, as will be readily appreciated. Positioning system 160 can include various subsystems and components that provide desired directions and orientations relating to X, Y, and Z axes for the extruding system 120 and/or the curing system 140 during 3D printing operations. Feedback system 180 can include various subsystems and components that provide precise and comprehensive information to allow the other systems to operate and interact cohesively during 3D printing operations, which can be fully automated.

Figure 2:
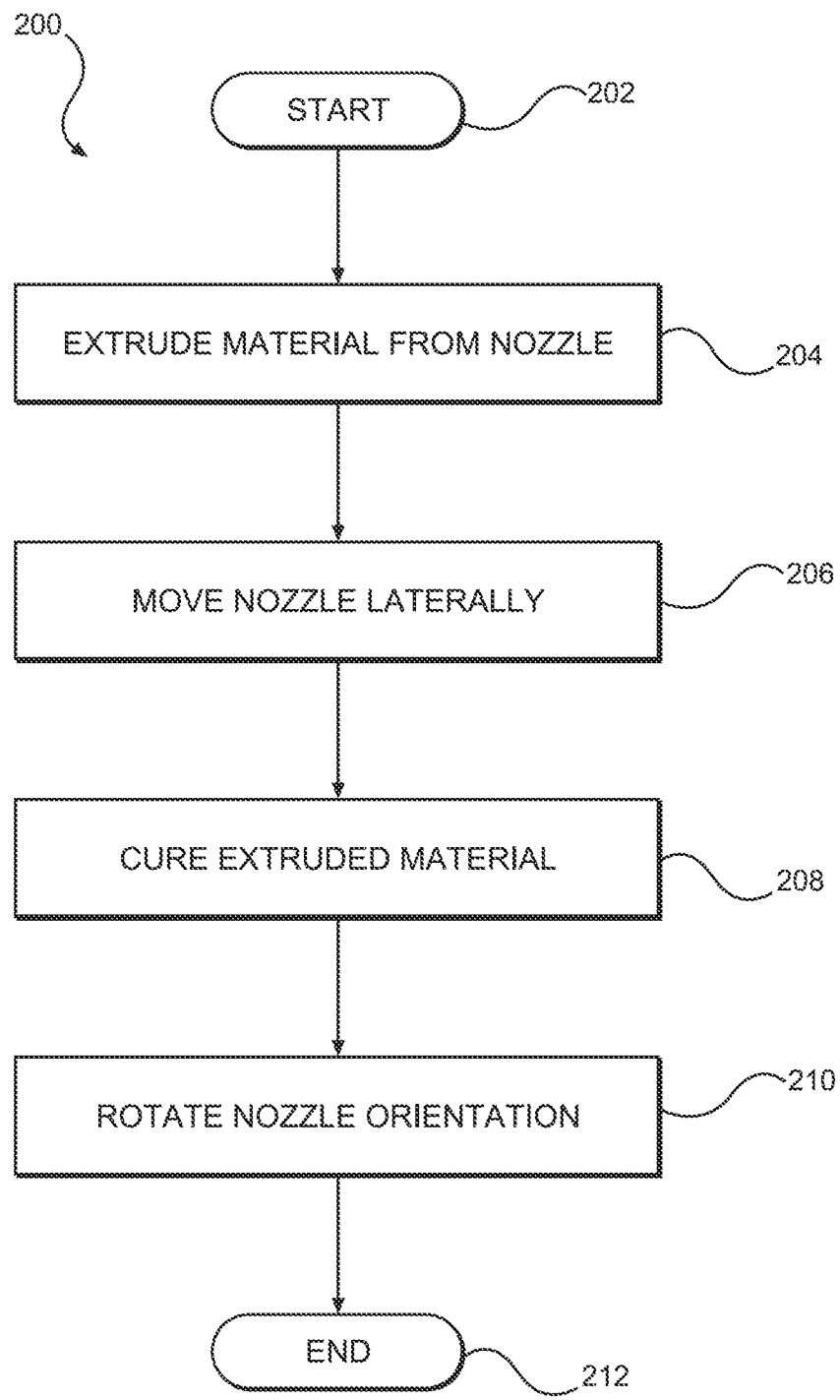
FIG. 2 illustrates a flowchart of an example method of 3D printing involving an adjustable printing angle according to one embodiment of the present disclosure.

Turning next to FIG. 2, a flowchart of an example method of 3D printing involving an adjustable printing angle is provided. It will be readily appreciated that method 200 can be a high level method and that one or more steps can be omitted and/or other steps can be added. For example, the steps of rotating a curing system and/or changing a curing intensity during the 3D printing process can be included. Furthermore, various steps can be performed in a different order and some steps can be performed simultaneously. For example, all of steps 204-210 can be performed simultaneously during a continuous 3D printing process. Further detailed steps and description are provided below with respect to the detailed method set forth in FIG. 10.

After a start step 202, a first process step 204 can involve extruding printing material from a nozzle. This can include feeding the printing material from a printing material source to a printing head and then extruding the printing material from a nozzle located at the printing head.

At the next process step 206, the nozzle can be moved laterally. This can involve movement of the printing head, to which the nozzle is mounted or otherwise coupled, such that moving the printing head moves the nozzle. Movement can be in or more of the XY, YZ, and XZ planes alone or in any combination. Moving the printing head and nozzle may also move the curing system in some arrangements.

At the next process step 208, the extruded printing material can be cured. This can involve optical curing, heat curing, or any other suitable printing material curing technique. In various arrangements, the printing material can be cured shortly after it is extruded from the nozzle. For example, a curing system can be arranged at the printing head such that it follows the nozzle and cures printing material right after the printing material is extruded from the nozzle. A shielding arrangement at the nozzle can prevent the curing of printing material on the nozzle itself, such that curing only takes place immediately after the nozzle have moved away from the freshly extruded printing material.

At the next process step 210, the nozzle orientation can be rotated. This can result in altering a printing angle at which the printing material is extruded from the nozzle. Altering the printing angle in this manner can then allow for further printing of extruded printing material at a different angle than which previous printing material was printed. Again, all steps can be performed simultaneously and in automated fashion, such that curing takes place on previously extruded printing material while new printing material continues to be extruded from the nozzle. Continuing the process can also allow for continuous printing before, during, and after the nozzle orientation has been rotated. Accordingly, all steps may be repeated as long as desired until the 3D printing of a building, building component, or other object is completed, or until a desired stage is finished. The method then ends at end step 212.

Figure 3:
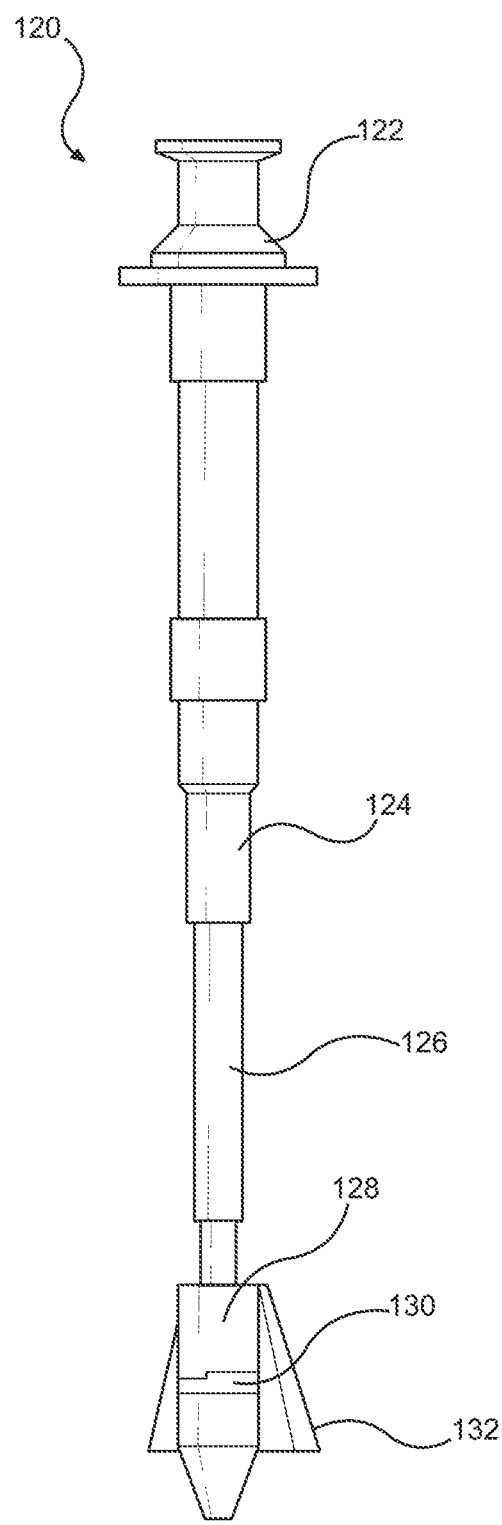
FIG. 3 illustrates in side elevation view an example extruding system of a 3D printing system according to one embodiment of the present disclosure.

Transitioning now to FIG. 3 an example extruding system of a 3D printing system is shown in side elevation view. Extruding system 120 can include various components, such as, but not limited to, a source coupler 122, a feed pipe first segment 124, a feed pipe second segment 126, a nozzle 128, a nozzle coupler 130, and a protective skirt 132, among other possible components.

Source coupler 122 can provide a proper connection between a printing material source of the 3D printing system and the feed pipe, specifically the feed pipe first segment 124. Source coupler 122 can be a flange connector, for example, although other types of couplers can be used. The feed pipe can have two separate segments, a feed pipe first segment 124 and a feed pipe second segment 126, one or both of which can be removable and replaceable from the overall extruding system 120. Both feed pipe first segment 124 and second segment 126 can be hollow or otherwise form internal channels therein to flow printing material therethrough and can be formed from the same or similar materials, such as, for example, stainless steel. Feed pipe first segment 124 can have a straight internal channel that provides consistent flow conditions for the 3D printing material to improve the 3D printing process and resulting product. Consistent flow conditions can be achieved where, for example, feed pipe first segment 124 has an internal cross section that forms a cylinder with a circular base and a conical portion.

Feed pipe second segment 126 can continue the printing material flow through its own internal channel to arrive at the nozzle 128. In some arrangements, feed pipe second segment 126 can be disposable or otherwise interchangeable, such that it can be removed and replaced with another feed pipe second segment, which may or may not be of the same size and shape. For example, one type of feed pipe second segment 126 can form a straight section of feed pipe, as shown in FIG. 3, while another interchangeable type of feed pipe second segment (not shown) can form an elbowed jointless feed pipe segment. Feed pipe second segment 126 can be readily removed and replaced to facilitate rapid changing of the feed pipe flow conditions and parameters for different printing purposes during an overall 3D printing process. The internal cross-section of the feed pipe second segment 126 can also be cylindrical, although varying diameter conical channel shapes may also be used. The two feed pipe segments 124, 126 can be connected in such a way that they form a straight pipe. Alternatively, feed pipe second segment 126 can have an elbow to result in a directional change in the flow of the printing material therethrough. For either type of feed pipe second segment 126, the feed pipe segments can be coupled at an angle between 0 and 90 degrees, which can provide another avenue for redirecting flow through the feed pipe and for adjusting the printing angle of the nozzle 128 and the overall extruding system 120.

In various embodiments the feed pipe can be in angular form with the possibility to adjust the angle in the feed pipe, such as between 0 and 270 degrees, during the 3D printing process depositing layers within the planes XY, YZ, XZ and any combination thereof. The internal dimensions of the pipe vary between 5 and 50 mm. In one embodiment the feed pipe can be an entirely straight pipe with the same internal dimensions along it. In another embodiment the feed pipe can have different internal dimensions along it in order to provide a consistent composite material flow in accordance with particular 3D printing requirements for a given process. Each configuration of the feed pipe is aimed to provide better 3D printing performance during different 3D printing modes.

Under any such feed pipe arrangement, nozzle 128 can be coupled to the end of feed pipe second segment 126 to extrude printing material that has come from the printing material source and passed through the feed pipe. Nozzle 128 can be made of any suitable material, such as, for example, steel, silicone, rubber, and other polymers. In various arrangements, the nozzle material can be chemically resistant to the composite material and any other materials that form the printing material and can also be and resistant to the effects of the curing system, such as by being irradiation resistant to light emitted from a light curing system. Nozzle 128 may have different configurations. In one embodiment, nozzle 128 can be a silicon cylinder with a conical part having a constant cylindrical internal dimension. In another embodiment, the internal passage through nozzle 128 can have a size and shape that variable, such as, for example, to provide overpressure for better composite material deposition during a 3D printing process.

It will be readily appreciated that nozzle 128 can have a longitudinal axis along which printing material is extruded during a printing process to form at least a portion of a 3D printed object. In operation, nozzle 128 can be configured to extrude printing material fed thereto by way of the feed pipe 124, 126 at a printing angle, where the printing angle is defined by the angle between the longitudinal axis and the top surface of a layer of printing material being printed.

The nozzle coupler 130 can provide a tight connection between the feed pipe and the nozzle 128. In particular, nozzle coupler 130 can removably couple feed pipe second segment 126 to nozzle 128. In some arrangements, nozzle coupler can be a loop connector to facilitate a suitably tight connection, although other types of couplers can also be used.

A protective skirt 132 can be located about an extrusion opening of nozzle 128 to avoid printing material curing directly at the nozzle immediately upon extrusion. In particular, protective skirt 132 can shield printing material as it is being extruded from a curing system, which may be coupled to the printing head such that it follows the movement of the nozzle 128 during the 3D printing process. Protective skirt 132 may be made of steel, silicone, rubber, other polymers, or any other suitable shielding material, and can be sufficiently sized to shield printing material right at the nozzle but not printing material that has been extruded and from which the nozzle has moved away. The nozzle material needs to be chemically resistant to the composite material and to the light emitted from the light emitting system.

In various embodiments, a curing system can be used to cure the printing material after it is extruded from the nozzle 128 and has exited a shielding region provided by protective skirt 132. Such a curing system can be an optical curing system, although other types of printing material curing can also be used, such as, for example, heat or chemical reaction curing systems. An optical curing system may include a plurality of light sources of any suitable type, such as, for example, light emitting diodes ("LEDs"). Any type of LEDs, such as laser diodes, can be used, and the number of LEDs may be variable between 2 and 10,000 or more. For better curing of the layer of printing material the number of light sources may be increased. The light emitting subsystem may also include a plurality of light sources presented by laser emitters installed on at least one electronic unit.

In various arrangements, the light sources may be combined into modules for better light curing performance. The number of light source modules can vary and may depend on the desired 3D printing parameters for a given application. For example, in the event that a rapidly polymerized composite is used in the printing material it may be sufficient to have only one light source module curing a deposited printing material layer from the top. Conversely, where a slowly polymerizable composite is used in the printing material, it may be useful to post-cure a printed layer even after deposition using one or more additional modules. Such additional light source module(s) can be located at an angle to the nozzle. In this manner, post-curing through layers can be performed every time the printing head returns to and passed over the exact same point the next time as it deposits printed material layers atop each other.

To improve the efficiency of the photopolymerization process, a suitable 3D printing optical curing system can include two connected and coordinated subsystems: a light emitting subsystem to perform light curing of the photopolymerizable material and a light focusing subsystem to focus the light emitted by the light emitting subsystem. The light focusing subsystem may be used for printing complex structures or objects when it may be desirable to adjust light output direction in order to arrange the light curing of the 3D printed layers in such a way that every part of a complex 3D printed structure or object can have an equal light curing exposing period and light power to achieve a desired degree of curing.

In various arrangements, wavelengths of the curing light sources can be varied between about 200 nm and 1000 nm, although other ranges are possible, and the various curing light sources can allow for a wide range of chemical systems in order to print a structure or object with precise desired properties that are particular to the structure or object type, such as, for example, a ceiling, floor, interior wall, exterior wall, infill region, curved region, or any portion thereof. Having multiple different light sources or curing modules with multiple light sources within one curing system can allow the quality of the 3D printed structure to be controlled depending on the desired 3D printing parameters. Use of a light focusing subsystem can allows light power to be concentrated at varying levels at the layer deposition spot, thus increasing the efficiency of the process and the printing speed. Further details of an optical curing system are provided in U.S. patent application Ser. No. 17/219,863 , entitled "HIGH INTENSITY LIGHT CURING FOR THREE-DIMENSIONAL PRINTING," which application is hereby incorporated by reference in its entirety herein.

Figure 4A:
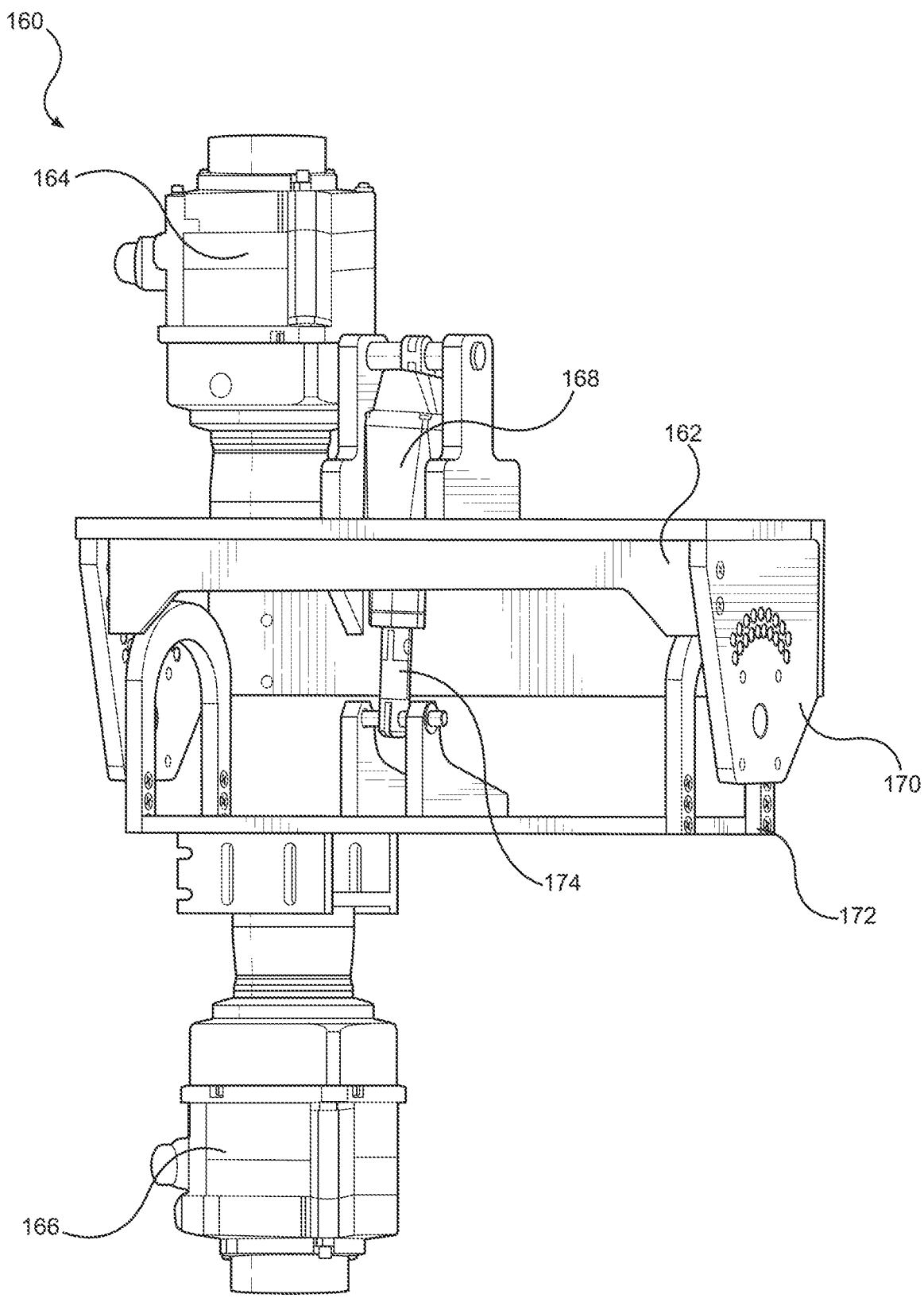
FIG. 4A illustrates in front perspective view an example positioning system of a 3D printing system according to one embodiment of the present disclosure.

Continuing with FIG. 4A an example positioning system of a 3D printing system is illustrated in front perspective view. Positioning system 160 can be used to change the printing angle of the printing head and nozzle inclination during the 3D printing process in a continuous and automated fashion. Such changes to the printing angle make it possible to print hinged structures, such as ceilings and floors, deposit layers on any surfaces with obstacles, such as, for example, printing on a frame or printing around a beam, create objects with complex geometric shapes and configurations, such as hyperboloids, and print free-form structures including internal objects within other objects, such as complex infills, among other various advantages.

Positioning system 160 can include a platform 162, a platform rotating subsystem 164, a curing system rotating subsystem 166, and a current position sensor 168. Platform 162 can be used for installing the printing head parts and can have a fixed portion 170 and a rotating portion 172. In various embodiments, the extruding system can be mounted to the rotating portion 172, such as shown in FIG. 1. Platform rotating subsystem 164 can provide for precise rotation of the extruding system during the printing process, such as by rotating the rotating portion 172 of the platform 162 with respect to the fixed portion 170 of the platform 162. A hydraulic actuator 174 or other suitable actuating component can be used to facilitate this relative rotation between the platform portions 170, 172.

Again, the printing angle at which printing material is extruded or deposited as a layer can be defined by the angle between the longitudinal axis of the nozzle and the top surface of a layer of printing material being printed. As such, rotation of the rotating portion 172 then adjusts the angle of inclination of the nozzle with respect to the layer of printing material being extruded, which thus adjusts the printing angle. In various arrangements, rotating portion 172 can be rotated in the YZ plane by up to 180 degrees, which results in the printing angle being adjusted by up to 180 degrees.

Curing system rotating subsystem 166 can operate to adjust the curing angle of the curing system, which can be mounted or otherwise coupled to the curing system rotating subsystem 166. In some arrangements this mounting or coupling can be commensurate with rotating portion 172, such that movement of rotating portion 172 also adjusts the movement of the curing system. In other arrangements, curing system rotating subsystem 166 can operate independently of platform rotating subsystem 164, such that the curing angle can be adjusted separately from the printing angle. This can result in independent control of the curing light direction within the XY and YZ plains, while nozzle tilt and printing angle is separately adjusted the YZ plane.

In some embodiments, the rotating subsystems can include two different drives. In one arrangement, the platform rotating subsystem 164 can include one drive for adjusting the nozzle tilt and thus the printing angle, while the curing system rotating subsystem 166 can have a separate drive for adjusting the curing system and thus the curing angle. More drives can be used depending on the overall system configuration. The types of drives can be the same or different, and can include any suitable type, such as electric, hydraulic, mechanical, pneumatic, and the like.

Positioning system 160 can also include one or more current position sensors 168, which can operate to detect the position of the printing head, the movement of the printing head, the printing angle, and/or the curing angle, among other system operational aspects. Current position sensor(s) can be end or continuous sensors and can be any suitable type of sensor(s), such as, for example, electric, magnetic, mechanical, ultrasonic, laser, and the like.

Figure 4B:
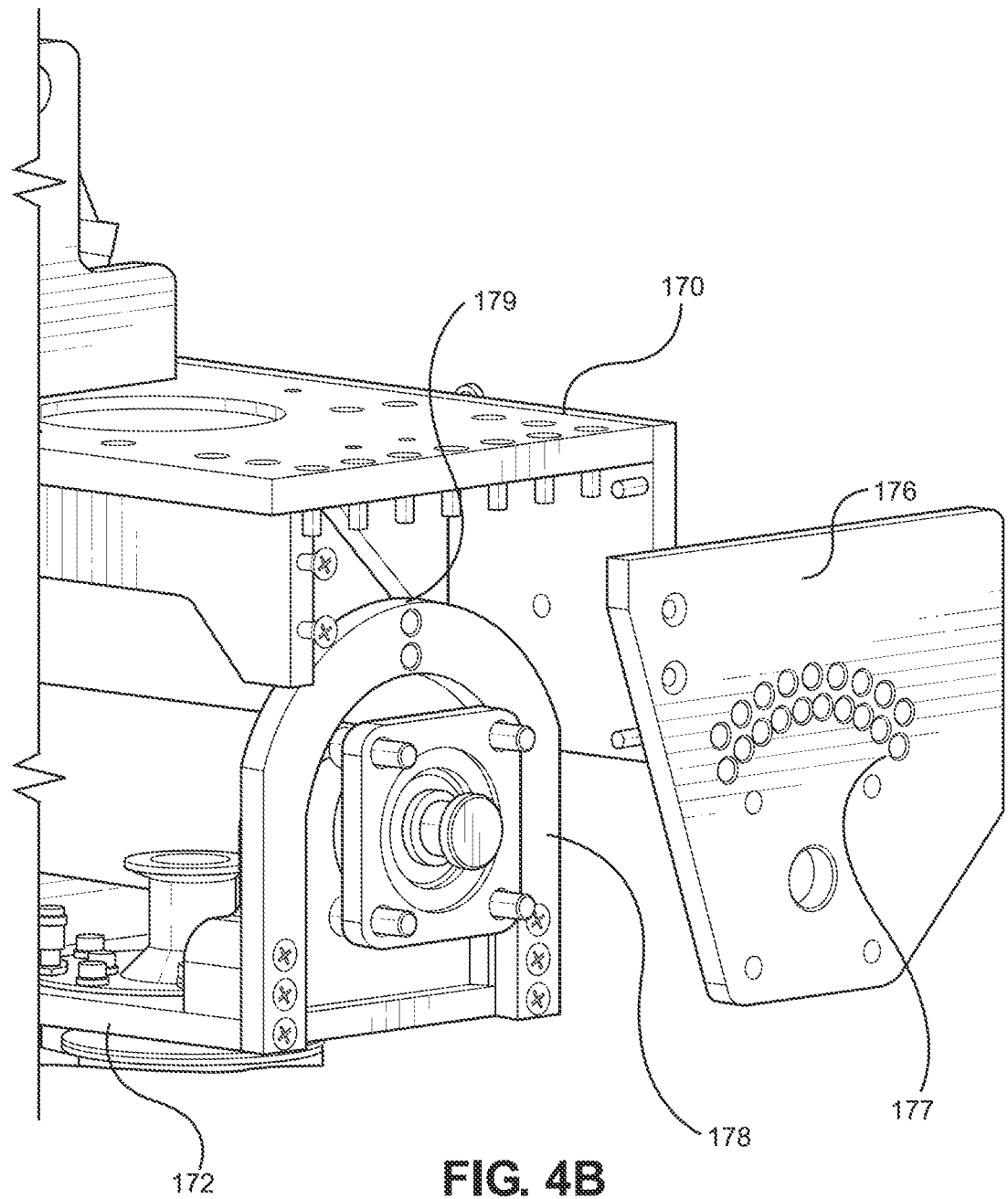
FIG. 4B illustrates in partially exploded view the example positioning system of FIG. 4A according to one embodiment of the present disclosure.

FIG. 4B illustrates in partially exploded view the example positioning system of FIG. 4A according to one embodiment of the present disclosure. Again, positioning system 160 can include a platform having a fixed portion 170 and a rotating portion 172. Fixed portion 170 can include an end plate 176 having multiple sets of angle setting holes 177 therein, which end plate 176 has been removed from fixed portion 170 to show perspective. Rotating portion 172 can include a mounting bracket 178 having a single set of angle setting bumps 179 that correspond to the multiple sets of angle setting holes 177 in end plate 176.

In operation, the single set of angle setting bumps 179 can lock into place within one of the sets of angle setting holes 177 to hold the overall platform steady with the rotating portion 172 in a fixed position at a given angle with respect to the fixed portion 170 during a 3D printing process. When a different printing angle is desired, rotating portion 172 can be rotated with enough force to push the set of angle setting holes 177 currently in use off of the angle setting bumps 179, whereupon the rotating portion 172 is rotated to the desired rotational orientation where a different set of angle setting holes 177 then locks onto the angle setting bumps 179.

In various embodiments, similar or other mechanisms can be used to hold the angular rotation of rotating portion 172 with respect to fixed portion 170. For example, one or more pins can extend through matching sets of angle setting holes on both of the fixed portion 170 and the rotating portion 172. In addition, more or fewer sets of angle setting holes or recesses may be formed to allow for a greater number of set angular positions, and thus corresponding printing angles for the nozzle and extrusion system. In other arrangements, a virtually infinite number of angular positions can be achieved by using a continuous relative rotational arrangement, with relative rotational positions being held between the fixed portion 170 and the rotating portion 172 by way of a mechanical clutch and locking brake system. As in the case of all systems and subsystems disclosed herein, operation of the positioning system 160 can be fully automated, with the system being controlled by one or more processors and electromechanical components.

Figure 5:
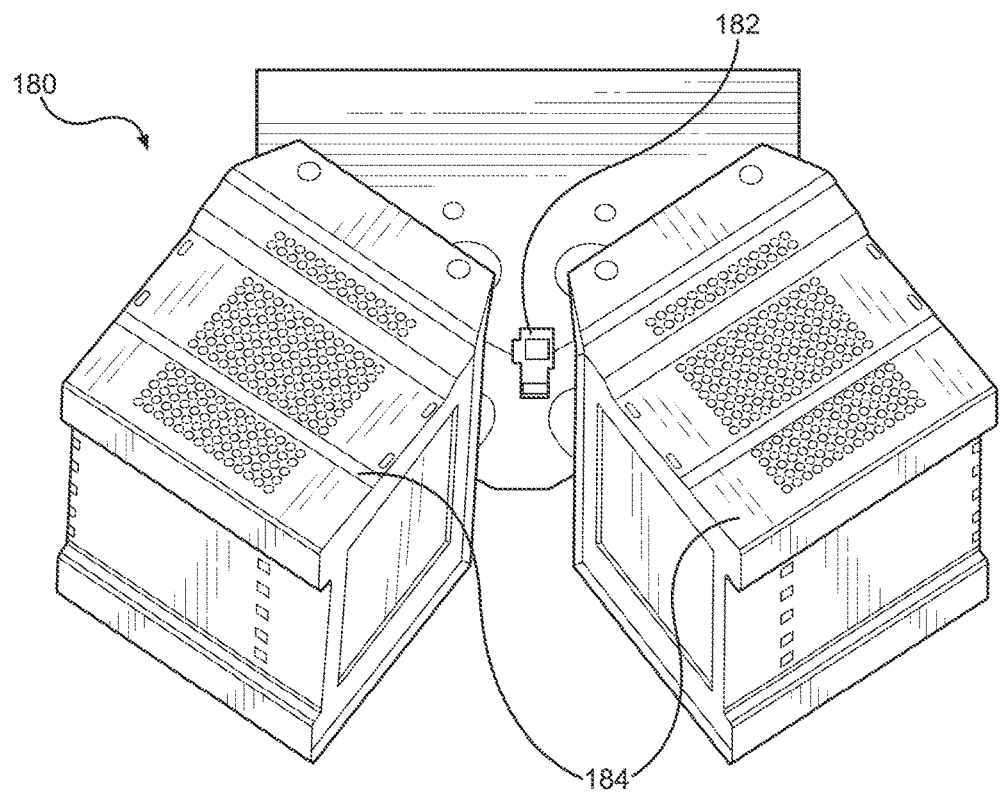
FIG. 5 illustrates in side perspective view an example feedback system of a 3D printing system according to one embodiment of the present disclosure.

Moving next to FIG. 5 an example feedback system of a 3D printing system is shown in side perspective view. Feedback system 180 can include a plurality of units which are parts of the various subsystems providing precise and comprehensive information about the 3D printing process. Feedback system can include, but is not limited to, one or more processors, video cameras, thermal vision cameras, printed layer measuring sensors, safety sensors, printing head location sensors, and light intensity measuring sensors, among other possible feedback system components. Sensors 182 can be placed at various strategic locations on the overall printing system, such as proximate one or more optical modules 184.

Video cameras can film and/or provide live video of the 3D printing process from several locations and angles. One or more thermal vision cameras can be used to record temperature data and imagery of the 3D printing process for faster troubleshooting and logging needs of the printing process and polymerization dynamics by thermal imagery. Printed layer measuring sensors can measure the height of one or more extruded printing material layers. Safety sensors can ensure that various parts of the printing head that are in a safe and proper position so as to avoid part collisions. Printing head location sensors can identify the current location of the printing head. Light intensity measuring sensors can detect the current light intensity so as to allow control of various light curing parameters. For example, light curing intensity can range from 0.1 to 10 W/cm$^2$ and can be adjusted during the printing process.

Figure 6:
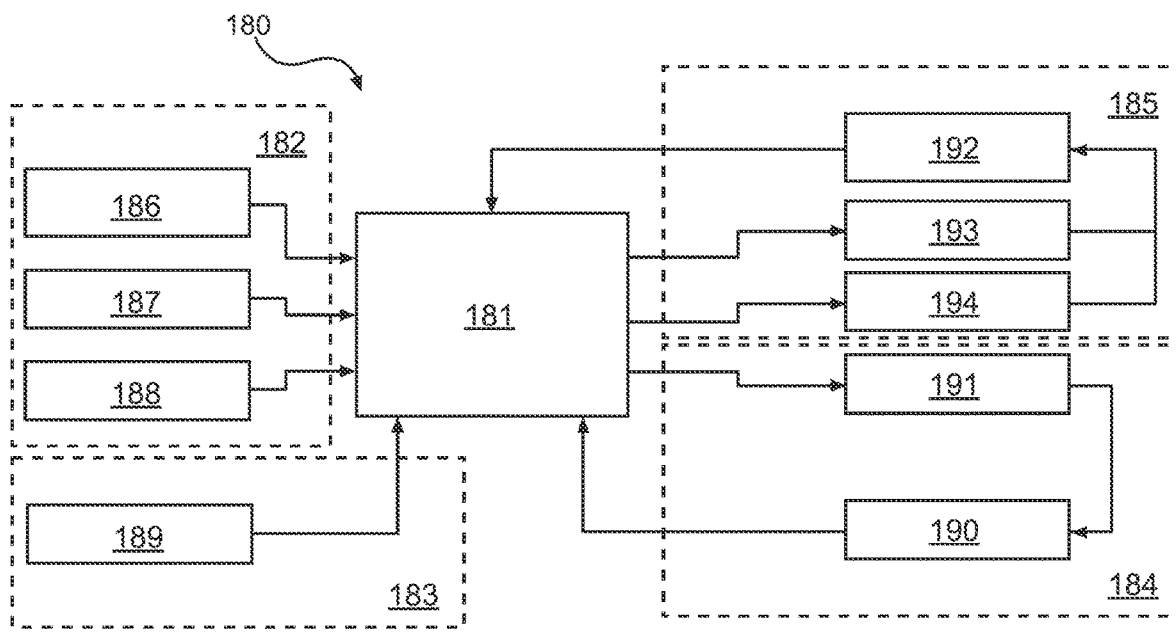
FIG. 6 illustrates a schematic diagram of an example feedback system of a 3D printing system according to one embodiment of the present disclosure.

FIG. 6 illustrates a schematic diagram of an example feedback system of a 3D printing system. Feedback system 180 can have a processor 181 and various different channels. Channels can include a quality assurance channel 182, a safety channel 183, a light intensity control channel 184, and a printing head location control channel 185, among other possible channels. The processor 181 can be a programmable logic controller or any other suitable controller to facilitate automated operations of the overall 3D printing system.

Quality assurance channel 182 can involve the collection and processing of data from one or more video cameras 186, one or more thermal vision cameras 187, and one or more layer height measuring sensors 188. Video camera(s) 186 can measure the weight of the layer of printing material in range from about 1 to 50 mm, for example. Thermal vision camera(s) 187 can collect information about the temperature field near the printing head in a range from about 20 to 120 degrees Celsius, for example. Layer height measuring sensor(s) can measure the height of the layer of printing material over a range from about 0.1 to 20 mm, for example.

Safety channel 183 can include data from one or more safety sensors 189 configured to recognize obstacles near the printing head at a range from about 50 to 300 mm, for example. Such obstacle recognition can be used to avoid collisions with outside obstacles as well as other components within the 3D printing system. Safety sensors 189 can be any suitable type, including for example, ultrasonic, laser, 3D scanning, magnetic, mechanical, and the like.

Light intensity channel 184 can include light intensity sensors 190 to detect light intensity and a control unit 191 to control the intensity of the light modules. Again, light modules can be LED modules, for example, and the light intensity of each module can range from about from 0.1 to 10 W/cm$^2$.

Head location channel 185 can include location position and angle position sensors 192 to provide information regarding the location of the printing head, the printing angle, and the curing angle. Sensors can be of any suitable type, such as, for example, electric, ultrasonic, laser, magnetic, mechanical, and the like. A printing angle drive 193 can use the information from these sensors to adjust the printing angle of the printing head, while a curing angle drive 194 can use the information from these sensors to adjust the curing angle of the curing system. In various embodiments, printing head position can be adjusted within a tolerance of about 0.1 mm, while nozzle tilt (e.g., printing angle rotation) can be adjusted within a tolerance of about 1 degree, which provides good printing quality for the overall 3D printing system.

The various components of feedback system 180 provide real time quality control, which leads to a decrease in waste. Further advantages realized through use of feedback system 180 can include the use of online video quality control by way of the video cameras, thermal imaging quality control by way of the thermal vision cameras, printed layer height quality control by way of the height measuring sensors, equipment safety assurance by way of the safety sensors, and quality assurance of light curing by way of the light intensity channel and sensors.

Figure 7A:
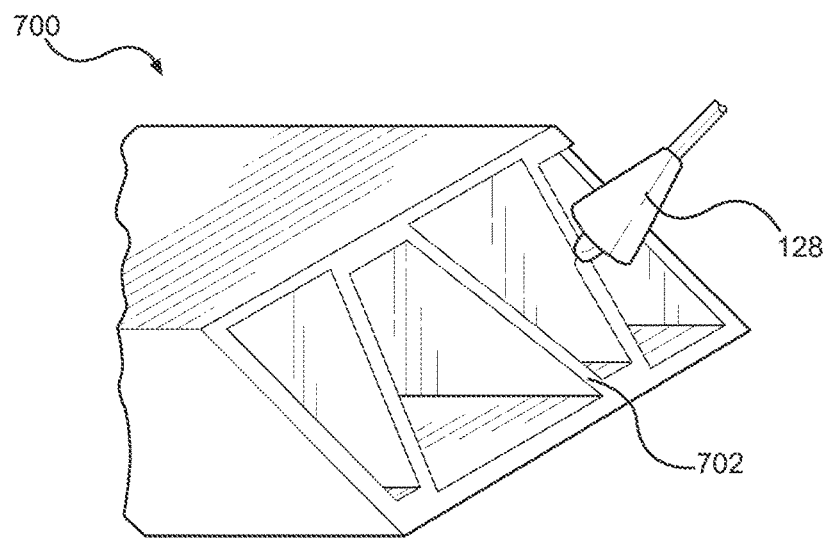
FIG. 7A illustrates in side perspective view an example 3D printing system printing a hinged construction component according to one embodiment of the present disclosure.

Transitioning next to FIGS. 7A through 9, various example use applications will now be illustrated. FIG. 7A illustrates in side perspective view an example 3D printing system printing a hinged construction component. Arrangement 700 can involve a nozzle 128 of an overall 3D printing system, such as that which is set forth above, printing a hinged construction component 702. Such a hinged construction component can be, for example, a ceiling, floor, or any other hinged construction as may be desired. As shown, nozzle 128 can be printing at a printing angle that is not 90 degrees with respect to the hinged construction component being printed. Such a printing angle can be, for example, 45 degrees, although other angles are also possible. Nozzle 128, as part of a printing head (not shown for purposes of illustration), can be angled to deposit layer upon layer of 3D printing material at an angle to form the overall hinged construction component 702, which extends horizontally in a direction toward nozzle 128.

Figure 7B:
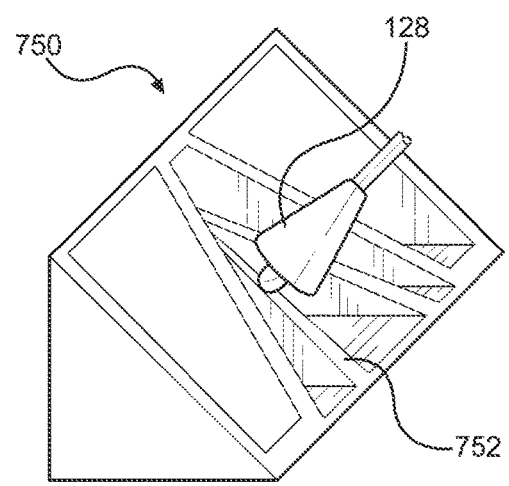
FIG. 7B illustrates in side perspective view an example 3D printing system printing a complex infill portion of a 3D printed object according to one embodiment of the present disclosure.

FIG. 7B illustrates in side perspective view an example 3D printing system printing a complex infill portion of a 3D printed object. Arrangement 750 can similarly involve a nozzle 128 of an overall 3D printing system printing a complex infill portion 752. Such a complex infill portion 752 can be, for example, a differently angled portion within a hinged construction component, such as hinged construction component 702 above. As shown, nozzle 128 can be printing at a printing angle that is not the same angle at which the hinged construction component 702 has being printed. Such a complex infill portion printing angle can be, for example, 30 degrees, although other angles are also possible. Nozzle 128 can again be angled to deposit layer upon layer of 3D printing material at an angle to form the overall complex infill portion 752 which can be formed within and between differently angled portions of the hinged construction component 702.

Figure 8:
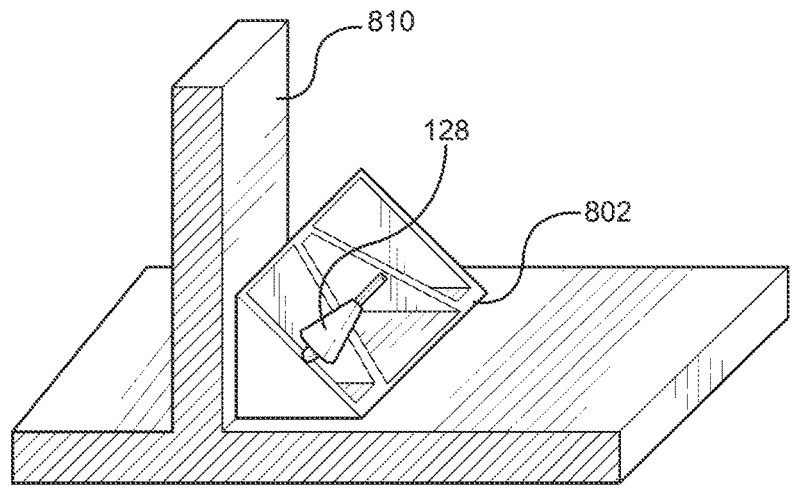
FIG. 8 illustrates in side perspective view an example 3D printing system printing around existing obstacles according to one embodiment of the present disclosure.

FIG. 8 illustrates in side perspective view an example 3D printing system printing around existing obstacles. Arrangement 800 can involve a nozzle 128 of an overall 3D printing system printing a building component 802 up against a previously existing obstacle 810. Building component 802 can be a hinged construction component or any other type of building component, as desired. Previously existing obstacle 810 can be an existing building foundation, wall, beam, or combination of obstacle types. As shown, nozzle 128 can again be printing at a printing angle that is not 90 degrees with respect to the building component 802 being printed. Such a printing angle can be, for example, 45 degrees, although other angles are also possible.

Figure 9:
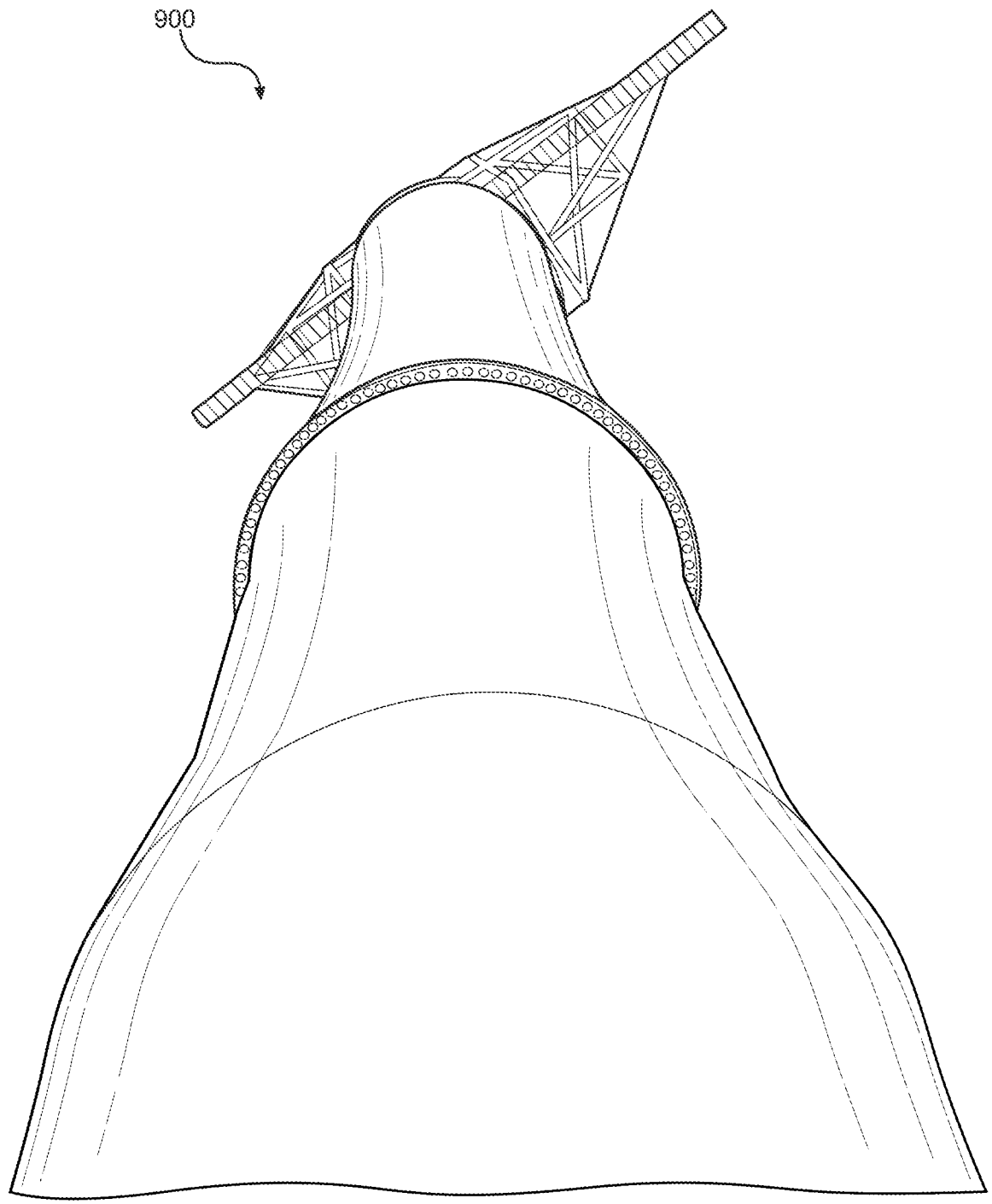
FIG. 9 illustrates in front perspective view an example hyperboloid object printed by a 3D printing system according to one embodiment of the present disclosure.

FIG. 9 illustrates in front perspective view an example hyperboloid object printed by a 3D printing system. Hyperboloid object 900 can be a custom designed complex object having various curves, twists, turns, and other features. As noted in detail above, the 3D printing process used to construct hyperboloid object 900 can involve continuous printing using a printing head and nozzle having an adjustable printing angle, as well as a light curing system having an adjustable curing angle. Printing and curing angles can be adjusted continuously during the 3D printing process so as to provide optimal angles for printing and curing of the composite 3D printing material. Such angular changes can be made depending on the curvature of the hyperboloid object 900 being printed at and given time and location of the printing head.

Figure 10:
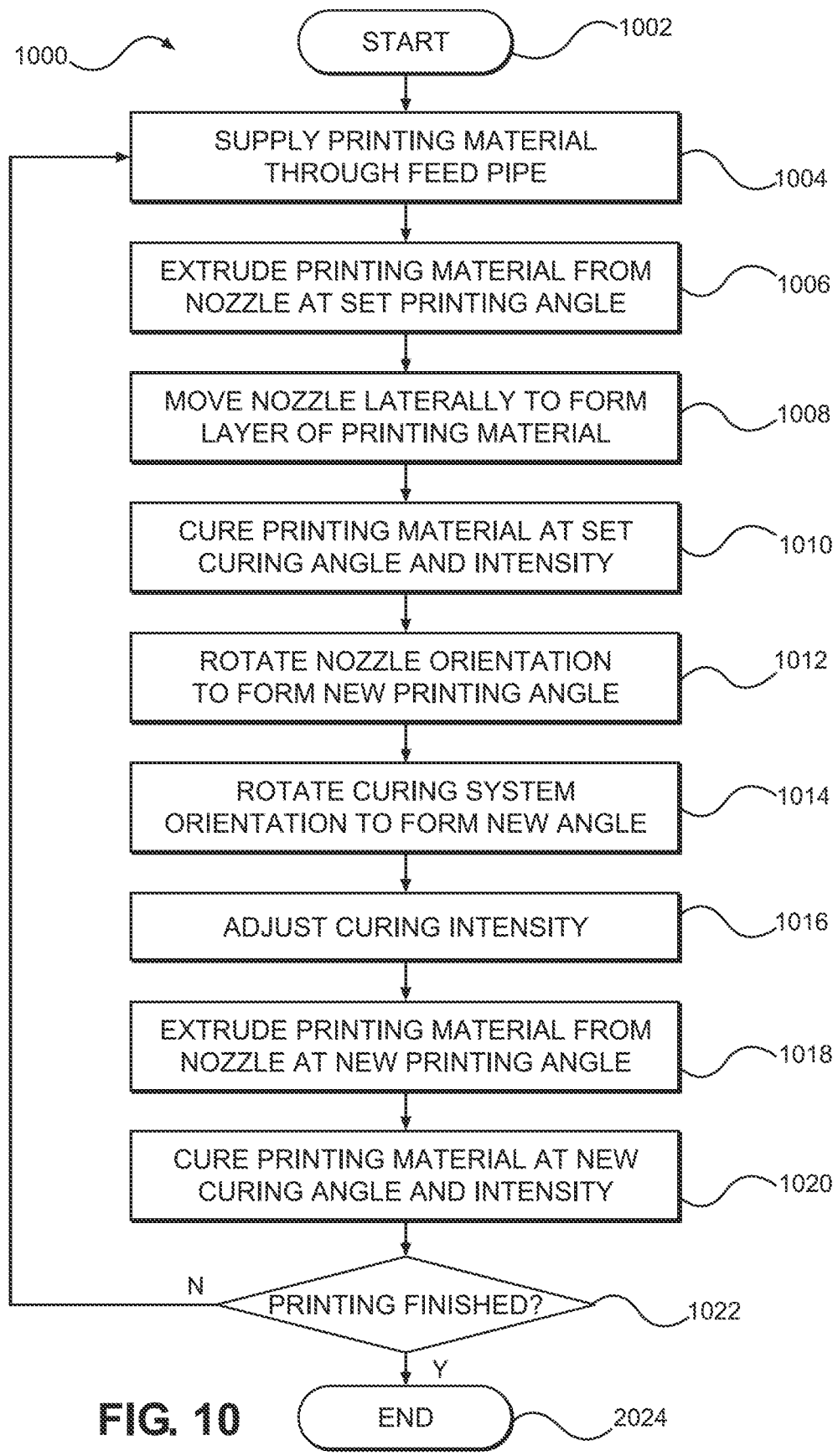
FIG. 10 illustrates a flowchart of an example detailed method of 3D printing a building component involving an adjustable printing angle, a light curing system, and a feedback system according to one embodiment of the present disclosure.

Lastly, FIG. 10 illustrates a flowchart of an example detailed method of 3D printing a building component involving an adjustable printing angle, a light curing system, and a feedback system. Method 1000 can be a detailed version of method 200 set forth above, with various steps and details being interchangeable and/or removable from one or both methods. As in the foregoing method 200, various steps of method 1000 can be performed in different orders and/or simultaneously, such as during a continuous 3D printing process. Furthermore, some or all steps may be repeated as desired until printing of a given 3D printed building component or other object is finished.

After a start step 1002, a first process step 1004 can involve supplying a printing material through a feed pipe. The printing material can come from a printing material source located outside the printing head in an overall printing system, and the feed pipe can be a segmented feed pipe with at least a first segment and a replaceable second segment. The first feed pipe segment can be straight, and the second feed pipe segment can be straight or angled, such as with an integrally formed elbow along the length of the second pipe segment. The first and second pipe segments may also be angled with respect to each other, or alternatively may form a consistent straight internal channel all the way therethrough.

At a subsequent process step 1006, printing material can be extruded from a nozzle at a set printing angle. The nozzle can be coupled directly to the feed pipe, and the set printing angle can be anywhere from 0 to 180 degrees with respect to a surface of a layer being printed.

At the next process step 1008, the nozzle can be moved laterally to form a layer of printing material. This can involve movement of the printing head, to which the nozzle is mounted or otherwise coupled, such that moving the printing head moves the nozzle. Movement can be in or more of the XY, YZ, and XZ planes alone or in any combination. Moving the printing head and nozzle may also move an associated curing system in some arrangements.

At the next process step 1010, the extruded printing material can be cured with a curing system at a set curing angle. Again, this can involve optical curing, heat curing, or any other suitable printing material curing technique. In various arrangements, the printing material can be light cured shortly after it is extruded from the nozzle. For example, a curing system can be arranged at the printing head such that it follows the nozzle and cures printing material right after the printing material is extruded from the nozzle. A protective skirt at the nozzle can prevent the curing of printing material on the nozzle itself, such that curing only takes place immediately after the nozzle have moved away from the freshly extruded printing material.

At the next process step 1012, the nozzle orientation can be rotated to form a new printing angle. This can result in altering the printing angle at which the printing material is extruded from the nozzle. Altering the printing angle in this manner can then allow for further printing of extruded printing material at a different angle than the set printing angle.

At the next process step 1014, the curing system orientation can be rotated to form a new curing angle. This can result in altering the curing angle at which the freshly extruded printing material is cured. The curing system orientation can be altered similarly with the nozzle orientation, or can be altered independently, such as by way of a separate drive.

At the next process step 1016, the curing system intensity can be adjusted to provide a new curing intensity. This can involve increasing or decreasing a light curing intensity, such as from a plurality of LEDs or other light sources arranged to cure a photopolymerizable printing material. Again, the light curing intensity can range from 0.1 to 10 W/cm$^2$, although other curing intensity values are also possible. In alternative curing arrangements, this can involve adjusting the curing intensity of the curing medium, such as, for example, heat.

At the next process step 1018, printing material can be extruded from the nozzle at the new printing angle. The new printing angle can also be anywhere from 0 to 180 degrees with respect to a surface of a layer being printed and can be different than the previously set printing angle. Again, the printing angle can be defined by the angle between the longitudinal axis of the nozzle and the top surface of a layer of printing material being printed.

At the next process step 1020, the extruded printing material can be cured at the new curing angle and new curing intensity. Again, the new curing angle can be adjusted to match the adjustment of the new printing angle or can be adjusted independently as needed depending upon the particular conditions of the region being printed. For example, accounting for a complex curved region of a building component may call for an adjustment to the printing angle to account for the curvature, but the complexities of the curved region may call for a different curing angle at a reduced curing intensity.

At subsequent decision step 1022, an inquiry can be made as to whether the 3D printing process is finished. If not, then the method can revert to process step 1004 and all steps can be repeated, with the new printing angle becoming the set printing angle, the new curing angle becoming the set curing angle, and the new curing intensity becoming the set curing intensity. If the printing process is finished at decision step 1022, however, then the method ends at end step 1024.

Again, all steps can be performed simultaneously and in automated fashion, such that curing takes place on previously extruded printing material while new printing material continues to be extruded from the nozzle. Continuing the process can also allow for continuous printing before, during, and after the nozzle orientation has been rotated.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A three-dimensional ("3D") printing system, comprising:
   an extruding system including a feed pipe coupled to a printing material source and a nozzle coupled to the feed pipe, the nozzle having a longitudinal axis along which printing material is extruded during a printing process to form at least a portion of a 3D printed object, wherein the nozzle is configured to extrude printing material fed thereto by way of the feed pipe at a printing angle, the printing angle being defined by the angle between the longitudinal axis and the top surface of a layer of printing material being printed;
   a curing system including a plurality of curing components configured to cure the printed material at an adjustable curing angle after the printed material has been extruded from the nozzle; and
   a positioning system including a platform configured to support the extruding system and the curing system and a platform rotating subsystem configured to rotate a rotating portion of the platform during the printing process, the platform having a fixed portion with a first set of angle setting features and the rotating portion that rotates with respect to the fixed portion, the rotating portion having a second set of angle setting features that interact with the first set of angle setting features, wherein rotating the rotating portion of the platform simultaneously adjusts the printing angle, rotates the second set of angle setting features with respect to the first set of angle setting features, and also repositions the curing system according to the adjusted printing angle.

2. The 3D printing system of claim 1, wherein the feed pipe includes a first segment coupled to the printing material source and a second segment removably coupled to the first segment and coupled to the nozzle.

3. The 3D printing system of claim 2, wherein the second segment of the feed pipe forms a straight pipe segment.

4. The 3D printing system of claim 2, wherein the second segment of the feed pipe forms a telescopic elbowed pipe segment.

5. The 3D printing system of claim 1, wherein the extruding system further includes a protective skirt located proximate the nozzle, the protective skirt being configured to shield printing material from the curing system as the printing material is extruded from the nozzle.

6. The 3D printing system of claim 1, wherein the extruding system further includes a source coupler configured to removably couple the feed pipe to the printing material source.

7. The 3D printing system of claim 1, wherein the extruding system further includes a nozzle coupler configured to provide a removable connection between the feed pipe and the nozzle.

8. The 3D printing system of claim 1, wherein the plurality of curing components includes light emitting curing components.

9. The 3D printing system of claim 8, wherein the plurality of curing components further includes a light focusing subsystem.

10. The 3D printing system of claim 1, wherein the positioning system further includes a first drive configured to rotate the rotating portion of the platform during the printing process and a second drive configured to rotate the curing system during the printing process.

11. The 3D printing system of claim 1, further comprising:
    a feedback system including at least a processor and one or more sensors, wherein the feedback system is configured to facilitate detecting a location of the nozzle with respect to the 3D printed object during the printing process.

12. The 3D printing system of claim 11, wherein the feedback system further includes one or more cameras configured to facilitate visual quality control.

13. The 3D printing system of claim 12, wherein the one or more cameras include a video camera configured to facilitate visual in-process quality monitoring and a thermal vision camera configured to facilitate visual in-process inspection of printed material curing and curing intensity adjustment.

14. The 3D printing system of claim 11, wherein the one or more sensors include at least one printed material layer height measuring sensor configured to facilitate quality control regarding further printing process correction.

15. The 3D printing system of claim 11, wherein the one or more sensors include at least one safety sensor configured to facilitate collision prevention between the 3D printing system and the 3D printed object or one or more other objects around the 3D printing system.

16. The 3D printing system of claim 11, wherein the one or more sensors include at least one position identifying sensor configured to facilitate system calibration and position adjustment.

17. The 3D printing system of claim 11, wherein the one or more sensors include at least one curing intensity sensor configured to facilitate curing quality control.

18. The system of claim 1, wherein the extruding system, the curing system, and the positioning system are included in a movable printing head that is configured to move in multiple directions during the printing process.

19. The system of claim 18, wherein the platform rotating subsystem is configured to rotate the rotating portion of the platform to adjust the printing angle while the printing head moves during the printing process.

20. The system of claim 1, wherein the plurality of curing components are situated around the longitudinal axis and are configured to rotate about the longitudinal axis during the printing process.

21. The system of claim 20, wherein the plurality of curing components form a C-shape around the longitudinal axis, are configured to be rotated completely around the longitudinal axis, and are configured to be rotated about the longitudinal axis based at least in part on the printing angle to facilitate collision prevention between the curing system and the 3D printed object or one or more other objects around the 3D printing system.

22. A three-dimensional ("3D") printing system, comprising:
    an extruding system including a feed pipe coupled to a printing material source and a nozzle coupled to the feed pipe, the nozzle having a longitudinal axis along which printing material is extruded during a printing process to form at least a portion of a 3D printed object, wherein the nozzle is configured to extrude printing material fed thereto by way of the feed pipe at a printing angle, the printing angle being defined by the angle between the longitudinal axis and the top surface of a layer of printing material being printed;

a curing system including a plurality of curing components configured to cure the printed material at an adjustable curing angle after the printed material has been extruded from the nozzle; and a positioning system including a platform configured to support the extruding system and the curing system and a platform rotating subsystem configured to rotate the platform during the printing process, the platform having a fixed portion and a rotating portion that rotates with respect to the fixed portion, wherein rotating the rotating portion of the platform adjusts the printing angle and also adjusts movement of the curing system, wherein the fixed portion of the platform includes an end plate and the rotating portion of the platform includes a bracket proximate the end plate, the bracket being configured to rotate with the rotating portion and to interact with the end plate, wherein the end plate includes multiple sets of angle setting holes and the bracket includes a single set of angle setting bumps, and wherein the single set of angle setting bumps is configured to rotate and lock into place with different sets of the angle setting holes when the rotating portion rotates to different rotational positions.

23. A three-dimensional ("3D") printing system, comprising:

an extruding system including a feed pipe coupled to a printing material source and a nozzle coupled to the feed pipe, the nozzle having a longitudinal axis along which printing material is extruded during a printing process to form at least a portion of a 3D printed object, wherein the nozzle is configured to extrude printing material fed thereto by way of the feed pipe at a printing angle, the printing angle being defined by the angle between the longitudinal axis and the top surface of a layer of printing material being printed;

a curing system including a plurality of curing components configured to cure the printed material after the printed material has been extruded from the nozzle; and a positioning system including a platform configured to support the extruding system and a platform rotating subsystem configured to rotate the platform during the printing process, the platform having a fixed portion including an end plate having multiple sets of angle setting holes and a rotating portion including a bracket proximate the end plate that rotates with respect to the fixed portion, the bracket having a single set of angle setting bumps, wherein rotating the rotating portion of the platform adjusts the printing angle and rotates the bracket to interact with the end plate by rotating the single set of angle setting bumps to lock into place with different sets of the angle setting holes.

* * * * *